Patented Nov. 4, 1952

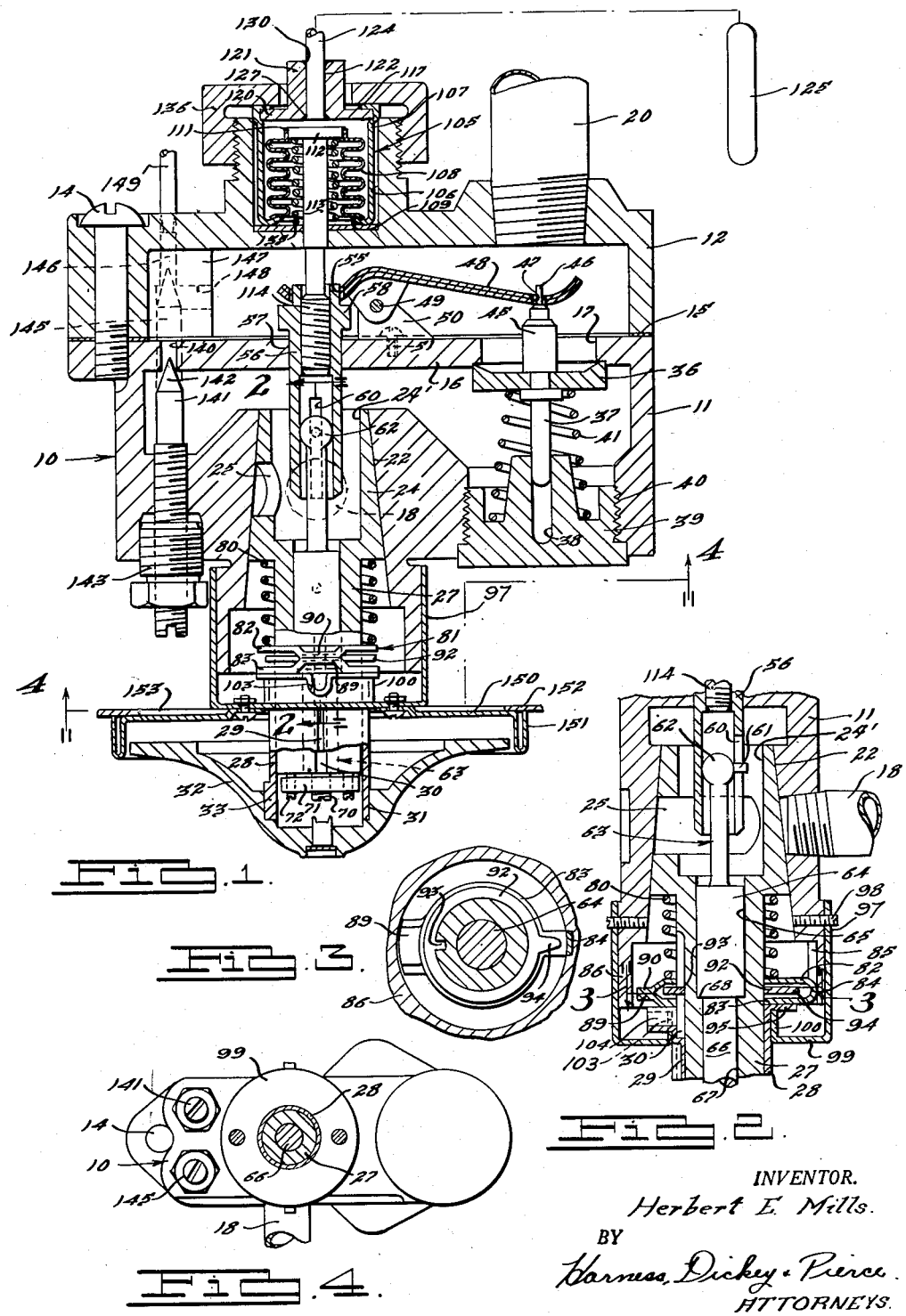
Nov. 4, 1952 — H. E. MILLS — 2,616,661
OVEN CONTROL
Filed March 14, 1947
INVENTOR.
Herbert E. Mills.
BY Harness, Dickey & Pierce
ATTORNEYS.

2,616,661

UNITED STATES PATENT OFFICE 2,616,661

OVEN CONTROL

Herbert E. Mills, Detroit, Mich., assignor to Wilson Mills, Inc., a corporation of Michigan Application March 14, 1947, Serial No. 734,729

6 Claims. (Cl. 251—165)

1

The invention relates to oven controls and it has particular relation to an oven control for gas ranges.

One object of the invention is to provide an improved type of oven control which requires less space in a direction rearward from the front of the range so as to render the work of installation simpler and to avoid as much interference as possible with other parts of the range.

Another object of the invention is to provide an oven control for gas ranges having an improved type of connection between the control knob and the operating parts of the valve so as to provide a more positive means for holding the knob in the valve closed position.

Another object of the invention is to provide an audible signalling means for indicating when the control knob has been turned sufficiently to cause the gas to flow.

Another object of the invention is to provide an improved type of casing and valve assembly which facilitates assembly and adjustments.

Other objects of the invention will become apparent from the specification, the claims attached thereto and from the drawings.

For a better understanding of the invention reference may be had to the drawings wherein:

Figure 1 is a cross-sectional view of an oven control, constructed according to one form of the invention.

Fig. 2 is a cross-sectional view taken substantially along the line 2—2 of Fig. 1.

Fig. 3 is a cross-sectional view taken substantially along the line 3—3 of Fig. 2.

Fig. 4 is a cross-sectional view on a smaller scale taken substantially along the line 4—4 of Fig. 1.

Referring to Fig. 1, the oven control illustrated comprises a casing generally indicated at 10 and this casing includes two parts 11 and 12. These parts are connected by a series of circumferentially spaced screws 14 and in order to prevent leakage of gas, a suitable sealing ring or gasket 15 is provided between the marginal portions of such parts of the casing. The part 11 of the casing has a partitioning wall 16 which separates the two parts of the casing and this wall has a valve opening 17 so that the gas may flow from part 11 into part 12. The part 11 is also connected to a gas line 18 adapted to supply gas to the oven and this line communicates with a frusto-conical opening 22 formed in the casing part 11. Gas is supplied to the oven during use by a pipe 20 connected to the part 12 of the casing.

2

The opening 22 has a frusto-conical tubular type valve head 24 turnably seated therein and the wall of this head has a circumferentially extending slot 25 in its side wall so that the gas flowing through pipe 18 can, when the valve element is turned to predetermined positions, flow into the central opening 24' in the element 24. Gas thus flowing to the central opening in the valve element can flow into the chamber formed by part 11 of the casing. The valve head 22 has an elongated shank portion 27 which extends out of the casing and hence out of the opening 22 and this shank portion at its outer end, has a sleeve 28 which is slidable on the shank. The sleeve is locked to the shank for rotation therewith by means of a key 29 shown by Fig. 2, which projects into a long keyway 30 in the surface portion of the shank. At its outer end, the sleeve projects into an opening 31 in a control knob 32 and in order to lock the sleeve and knob together, a key 33 is provided on the sleeve and this key fits a corresponding slot in the wall of the knob. Additional frictional means may be provided, if desired, for holding the knob on the sleeve so that ordinarily it will not separate therefrom while still permitting removal of the knob by using a small amount of pulling force.

The construction so far described merely provides for the flow of gas into the casing part 11 through turning of the knob, 32. Control of the gas flow through the valve opening 17 is effected by means of a valve 36, having a stem 37 slidably mounted in an opening 38 in a plug 39 threaded as indicated at 40 into the casing in alignment with the valve opening. The spring 41 abutting the plug at one end and the valve at the other urges the valve to closed position. It will be noted that the plug is located at the same side of the casing as the knob is located and it should be understood that this side of the casing is towards the front of the gas range.

At its opposite side the valve 36 has a stem 45 terminating in a small projection 46 which loosely extends through an opening 47 in a bimetallic arm 48. This arm is pivoted intermediate its ends on a pin 49 supported on a bracket 50 secured by screws 51 to the wall 16. It will be observed that the pivot pin 49 is adjacent to the axis of the valve element 24. At that side of the pivot pin 49 opposite the valve 36, the bimetallic arm is provided with an opening 55 and this opening receives one end of a tubular element 56 which slidably projects through an opening 57 in the wall 16. This opening is in alignment with the axis of the opening 22 and the tubular element projects into the central opening 24′ of the valve element 24. An annular shoulder 58 on the tubular element adjacent the bimetallic arm serves as a means for moving the arm and thus opening the valve 36 when the tubular element 56 is shifted in the valve open direction.

That end of the tubular element 56 projecting into the valve element opening 24′ has an axially extending slot 60 in its wall and this slot receives a radial projection 61 provided on a head 62 of an operating rod 63, upon which the tubular element may slide. This rod has an enlarged cylindrical portion 64 turnably but closely fitting a bore portion 65 in the stem 27 and a second, but reduced portion 66 which turnably but closely fits a small bore portion 67 in the stem. This arrangement provides a shoulder 68 at the junction of the two bores against which the enlarged portion 64 of the rod can abut.

Referring to Fig. 1, the outer end of the rod 63 projects beyond the end of the stem 27 and terminates in a reduced threaded portion 70. A washer like nut 71 is threaded on this reduced portion and this nut is provided with screws 72 adapted to abut against the end of the stem. If the screws 72 are tightened, this draws the rod 63 outwardly so as to cause the enlarged portion 64 of the rod to bind tightly against the shoulder 68 and in this way the rod is locked against rotation relative to the stem. Loosening the screws 72 permits turning of the rod 63 relative to the stem by turning the lower threaded end 70 of the rod and it will be noted that a screw driver slot is provided in the end for this purpose. Turning of the rod 63 causes the rotation of the sleeve 56 so as to move the shoulder 58 towards or from the bimetallic arm.

The valve element 24 is urged into tight but turnable relation with the wall of opening 22 by means of a helical spring 80 encircling the shank portion of the stem 27 and abutting the valve head 24. This spring at its outer end, abuts a washer like element 81 slidable on the stem and comprising rings 82 and 83 integrally connected at one side by folded metal portion 84 extending radially and outwardly into a keyway or a slot 85 formed in a cylindrically projecting wall 86 on the casing. In this way the element 81 is prevented from turning relative to the casing while still being slidable along the slot 85. The two rings 82 and 83 are separated so as to provide a space between them except at a point diametrically opposite the portion 84 where the rings have projecting tongues 89 and 90 which normally are in contact.

A washer 92 is mounted on the shank 27 between the two rings 82 and 83 and the washer 92 has a key 93 projecting into the keyway 30 in the shank. Diametrically opposite the key 93, as best shown in Fig. 3, the washer 92 has a tongue 94 and this tongue is so arranged that it must pass between the tongues 89 and 90 as the shank 27 is turned through more than half of a revolution from the position shown in Fig. 2. The sides of the tongues are desirably beveled so as to facilitate entry of the tongue 94 between the tongues 89 and 90 and it is evident that after the tongue 94 passes between the tongues 89 and 90, the latter snap back into contacting relation and this creates an audible signal.

The arrangement of the parts is such that when the knob is turned so as to cause the shoulder 58 to swing the bimetallic arm sufficiently to open the valve 36, the audible signal may be heard and in this way the user of the oven will know that the gas has been turned on. In other words, turning of the stem 27 through one-half of a revolution ordinarily will open valve 36, at least to the extent that it is open in the lower temperature range of oven operation so that the signal is heard as soon as the valve is open sufficiently for igniting the burner.

The sleeve 28 to which the knob 32 is connected terminates inwardly in an outwardly projecting flange 95 which abuts the lower ring 83 and in order to hold the sleeve against movement by the spring 80 beyond the position shown in Fig. 2, an outer sleeve 97 extends over the projection 86 on the casing and is secured thereto by screws 98. This outer sleeve at its outer end is turned inwardly as indicated at 99 and then reversely as indicated at 100 with the reversely turned or reentry portion abutting the flange 95. In order to provide a suitable lock for preventing accidental turning of the knob and hence the shank 27, and also to provide a positive indication as to when the valve is in a closed position, the flange 100 as best shown by Fig. 1, has a notch 103 adapted to receive a downwardly extending U-shaped projection 104 formed in the end of the sleeve 28. As long as the projection 104 is in the notch any ordinary turning of the knob is prevented. It will be evident however, that if the knob is pushed inwardly, the sleeve 28 will shift along the shank 27 against spring 80 and then after the notch is cleared, the knob may turn and thereafter, at least through one revolution, the projection 104 will ride on the edge of the re-entry portion 100. It thus requires inward movement of the knob in order to initiate opening of the valve and then when the valve is closed and the knob snaps outwardly the user will realize that the valve is in its closed position.

Thermostatic control of the valve is effected by a thermal element, generally indicated at 105 in Fig. 1, which is located in a recess 106 in the wall of the casing part 12. This thermal element includes a cylindrical member 107 soldered to one end of metal bellows 108 as indicated at 109. The opposite end of the bellows is soldered as indicated at 111 to a head 112 provided on a pin 113, extending downwardly through the casing wall and terminating a left hand threaded end 114. This threaded end is threaded into the upper end of the tubular element 56 so that movement of the bellows will shift this element and hence control the bimetallic arm. At its upper end the wall 107 is folded over and soldered as indicated at 117 to an annular flange 120 formed on a bushing 121. This bushing has an opening 122 which receives a copper tube 124 leading to a bulb 125 disposed in the oven. The inner end of the copper tube is soldered to the inner end of the bushing as indicated at 127 and at the outer end of the bushing the opening 122 is flared outwardly as indicated at 130 so that bending of the tube 124 will not be against any sharp corner.

The tube 124, bulb 125 and space around the bellows is filled with a suitable thermostatic fluid as used in oven controls and upon expansion of this fluid the bellows contract so as to allow the valve to move towards closed position whereas upon contraction of the fluid the bellows expand so as to cause the valve to be opened. A coil spring 135 within the bellows acts to return it to expanded position upon cooling of the oven and hence upon contracting action of the thermal fluid. The thermal assembly just described is held in the opening 106 by a cap 136 threaded onto the casing and having an apertured end wall which clears bushing 121 but abuts the folded over end of the wall 107. It is evident that this nut may be tightened and loosened without causing turning of the tube 124 and in this way twisting of the tube as so often has occurred heretofore, is avoided.

In order to provide a pilot light and also a low flame when the knob 32 is in a valve open position, even though the valve 36 is closed, two adjustable controls are provided respectively for these conditions. The low fire flame is obtained by providing a small opening 140 in the wall 16 and employing a threaded stem 141 having a conical end 142 for varying the effective size of the opening. This stem is threaded through the casing wall and extends through a packing nut or gland 143 threaded into the casing. Gas will flow through the opening 140 and to the burner independently of the valve 36 but of course the gas will be closed off completely if the knob 32 is in closed position. A second, and similar stem for controlling the pilot is indicated at 145 and the conical end of this stem is adapted to control the amount that a small opening 146 is allowed to communicate with the chamber in casing part 12. This second stem and the opening 146 extend through an integral portion 147 of the casing and this portion also includes an opening 148 for allowing the gas to flow from part 12 of the casing into the opening 146. The opening 146 in turn is connected to a pilot line 149 extending to the oven.

It is evident from this description that the stem 141 allows a certain amount of gas to flow to the burner independently of valve 36 and that this will permit both low flame and the pilot light. The pilot light is provided merely to ignite the gas again in the event a gush of air should put the burner out.

For indicating the temperature of the oven, a disk 150 is secured to the end of the sleeve 97 and this disk has a rim 151 extending around the edge of the knob 32. Suitable indicia on the knob and flange 151 show the off and different temperature positions. The knob and disk 150 are located at the front of the stove panel indicated at 152 and a sufficiently large opening indicated at 153 is provided in this panel for accommodating any parts which must project through the opening.

With the parts as shown, the valve 36 is closed while the low flame and pilot flame passages are open sufficiently to permit low flame and pilot flame when the opening 25 is open to the gas line 18. The knob is then pushed inwardly and then turned a little more than half a revolution and this amount of turning is audibly indicated by snapping of the tongues 89 and 90 back together after the tongue 94 has passed between them. The oven burner is then ignited by a match in the usual manner. Turning of the knob to or past the position indicated also will open the valve 36 to allow the gas to flow to obtain a higher burner flame which depends upon the extent to which the knob has been turned. As the oven temperature increases, the thermal fluid causes the bellows to contract and move the operating stem 113 so as to allow the valve 36 to move towards closed position. Movement of the valve 36 towards and from closed position in accordance with changes in the temperature of the thermal fluid will thus act to maintain the oven at a substantially constant temperature in accordance with the knob setting.

It is to be understood that the slot 25 in the valve head is out of communication with the pipe 18 when the knob 32 is in its "off" or closed position shown in the drawings and that the slot is sufficiently long circumferentially of the valve head that it will be open to the pipe after it is turned through the half revolution mentioned and remain open to the pipe when turning the knob through a substantial or major part of the second half revolution. This enables obtaining temperature adjustments while the slot is open to the pipe.

The arrangement of the parts permits using a casing of smaller depth in a direction rearward with respect to the front of the stove and this is extremely desirable so as to avoid interference. Access to the main valve 36 may be had from the front of the stove and ordinarily the panel 152 is removable to permit this access. It is evident that by having the casing in two parts, any part of the valve may be changed easily or cleaned or otherwise repaired without difficulty. It is apparent also, an audible signal has been provided indicating when the gas has been turned on sufficiently for igniting the burner and that means is provided for indicating when the valve is in its closed position and for holding it in that position. Furthermore, it is evident that an improved type of thermostat arrangement has been provided which will prevent breakage of the tube through twisting as well as breaking of the tube through bending. Soldering of the inner end of the tube will preserve this connection because any forces such as occur through bending of the tube will not effect the connection.

Although only one form of the invention has been illustrated and described in detail, it will be apparent to those skilled in the art that various modifications may be made without departing from the scope of the claims.

What is claimed is:

1. An oven control comprising a casing having a valve opening, a valve stem element including a valve head at its inner end seated in the opening, a sleeve on the outer end of the element and keyed thereto so that the sleeve may slide on the element while being drivingly connected thereto, means operatively connected to the sleeve for turning the stem through the sleeve, means on the casing and sleeve for limiting outward movement of the latter, spring means between the valve head and sleeve for holding the head seated in the opening and the sleeve in its outermost position, and cooperating releasable means on the sleeve and casing locking the sleeve against turning while in said outermost position and being releasable upon predetermined inward movement of the sleeve prior to the turning thereof.

2. An oven control comprising a casing having a valve opening, a valve stem element including a valve head at its inner end seated in said opening, a sleeve on the outer end of the element and keyed thereto so that the sleeve may slide on the element while being drivingly connected thereto, a radially outwardly directed flange on the sleeve, a second, larger sleeve, fixed to the casing and projecting outwardly over the inner end of the first sleeve and having a re-entry, smaller sleeve portion disposed axially outwardly to the flange on the first sleeve so as to provide an abutment for limiting outward movement of the first sleeve, spring means between the valve head and flange for urging the first sleeve to its outermost position and a radial projection on the first sleeve adapted to ride on the edge of the re-entry sleeve portion when the first sleeve is turned, said re-entry sleeve portion having a notch at one point for receiving the projection so as to hold the first sleeve against turning.

3. An oven control comprising a casing having a valve opening, a valve stem element including a valve head at its inner end seated in said opening, a sleeve on the stem, key means drivingly connecting the sleeve and stem but permitting the sleeve to slide axially on the stem, a radial flange on the sleeve, a larger sleeve fixed to the casing and extending over the first sleeve and having a re-entry portion extending towards said flange and provided with a notch at one point, a projection on the flange adapted to drop into said notch when the first sleeve is turned to one position and at other times to ride on the edge of the re-entry sleeve portion, a spring on the stem and engaging at one end the valve head, audible signal means between the other end of the spring and said flange and comprising two ring elements having portions adapted to engage and separate in snap action manner when one ring element is turned relative to the other, key means connecting one ring element to the casing while permitting its movement along the stem, and key means connecting the other ring element to the stem while permitting its movement along the stem.

4. An oven control comprising a casing having a valve opening, a valve stem having a valve head seated in said opening, a coil spring on the stem and having one end abutting the head, abutment means on the casing and extending around the stem beyond the other end of the spring, a sleeve slidably keyed to the stem, means operatively connected to the sleeve for turning the stem through the sleeve, means on the sleeve and abutment means for limiting outward movement of the sleeve and requiring that the sleeve be moved inwardly a predetermined distance before it can be turned, and means including an element fixed to the casing against turning and an element turnable with the stem for engaging said first-named element and creating an audible signal when the sleeve is turned a predetermined amount.

5. An oven control comprising a casing having a valve opening, a valve stem having a valve head seated in said opening, a coil spring on the stem and having one end abutting the head, abutment means on the casing and extending around the stem beyond the other end of the spring, a sleeve slidably keyed to the stem, means operatively connected to the stem for turning the stem through the sleeve, means on the sleeve and abutment means for limiting outward movement of the sleeve, and means for creating an audible signal when the stem is turned a predetermined amount and; including an element fixed to the casing against turning and an element turnable with the stem for engaging said first named element, one of said elements being adapted upon actuation thereof to produce an audible signal and the other of said elements being effective upon a said predetermined amount of rotation of said stem to actuate said one of said elements.

6. An oven control comprising a casing having a valve opening, a valve stem element including a valve head at its inner end seated in the opening, a sleeve slidably disposed on the outer end of the element and keyed thereto so that the sleeve may be axially moved relative to the stem between an operative position and an inoperative position, while remaining keyed thereto, resilient means on the stem between the valve head and inner end of the sleeve urging said sleeve towards said inoperative position, and a knob fastened to the outer end of the sleeve for turning it.

HERBERT E. MILLS.

REFERENCES CITED

The following references are of record in the file of this patent:

UNITED STATES PATENTS

| Number | Name | Date |
| --- | --- | --- |
| 965,095 | Filson | July 19, 1910 |
| 992,502 | Hollis | May 16, 1911 |
| 2,089,617 | Mueller | Aug. 10, 1937 |
| 2,183,825 | Steffen | Dec. 19, 1939 |
| 2,194,714 | Mueller | Mar. 26, 1940 |
| 2,217,963 | Mueller | Oct. 15, 1940 |
| 2,236,009 | Rutherford | Mar. 25, 1941 |
| 2,257,880 | Harper | Oct. 7, 1941 |
| 2,262,703 | Stuckenholt | Nov. 11, 1941 |